(12) United States Patent
Dash et al.

(10) Patent No.: US 9,671,067 B2
(45) Date of Patent: Jun. 6, 2017

(54) FLUE GAS CONDITIONING SYSTEM AND METHOD

(71) Applicant: ALSTOM Technology Ltd, Baden (CH)

(72) Inventors: Nanda Kishore Dash, Orissa (IN); Anders Nils Gustav Karlsson, Braas (SE); Elisabeth Pettersson, Vaxjo (SE); Pankaj Kumar Gupta, Rajasthan (IN)

(73) Assignee: General Electric Technology GmbH, Baden (CH)

( * ) Notice: Subject to any disclaimer, the term of this patent is extended or adjusted under 35 U.S.C. 154(b) by 253 days.

(21) Appl. No.: 14/496,208

(22) Filed: Sep. 25, 2014

(65) Prior Publication Data

US 2015/0013775 A1 Jan. 15, 2015

Related U.S. Application Data

(63) Continuation of application No. PCT/IB2013/052658, filed on Apr. 3, 2013.

(30) Foreign Application Priority Data

Apr. 4, 2012 (IN) ............................ 1040/DEL/2012

(51) Int. Cl.
| | |
|---|---|
| *F17D 5/00* | (2006.01) |
| *B03C 3/013* | (2006.01) |
| *G01F 1/58* | (2006.01) |

(52) U.S. Cl.
CPC ............... *F17D 5/00* (2013.01); *B03C 3/013* (2013.01); *G01F 1/58* (2013.01); *B03C 2201/24* (2013.01);

(Continued)

(58) Field of Classification Search
CPC ....... B03C 3/013; B03C 2201/24; G01F 1/58; F17D 5/00; Y10T 137/7736; Y10T 137/0329
See application file for complete search history.

(56) References Cited

U.S. PATENT DOCUMENTS

| | | | |
|---|---|---|---|
| 4,746,331 A | 5/1988 | Truce | |
| 4,779,207 A * | 10/1988 | Woracek | ................ B01D 53/30 159/4.02 |

(Continued)

FOREIGN PATENT DOCUMENTS

| | | |
|---|---|---|
| CN | 85104564 A | 12/1986 |
| CN | 1080381 A | 1/1994 |

(Continued)

OTHER PUBLICATIONS

Chinese Office Action issued in connection with corresponding CN Application No. 201380029369.9 on Feb. 6, 2016.

(Continued)

*Primary Examiner* — Shogo Sasaki
(74) *Attorney, Agent, or Firm* — GE Global Patent Operation; Rita D. Vacca

(57) ABSTRACT

Disclosed are a system (100) and a method (200) for being utilized in an industrial plant (10) for determining injection rate of at least one Flue Gas Conditioning Agent (FGCA) from a FGCA discharge unit (18) into a flue gas leading from a boiler (12) to be introduce into an Electrostatic Precipitator (ESP) (14) of an industrial plant (10). The system (100) and method (200) is capable of determining the optimal injection rate of the FGCA based on ESP (14) data to increase the efficiency of the ESP (14) for efficient collection of dust particles from the flue gas stream.

12 Claims, 3 Drawing Sheets

Figure 1:
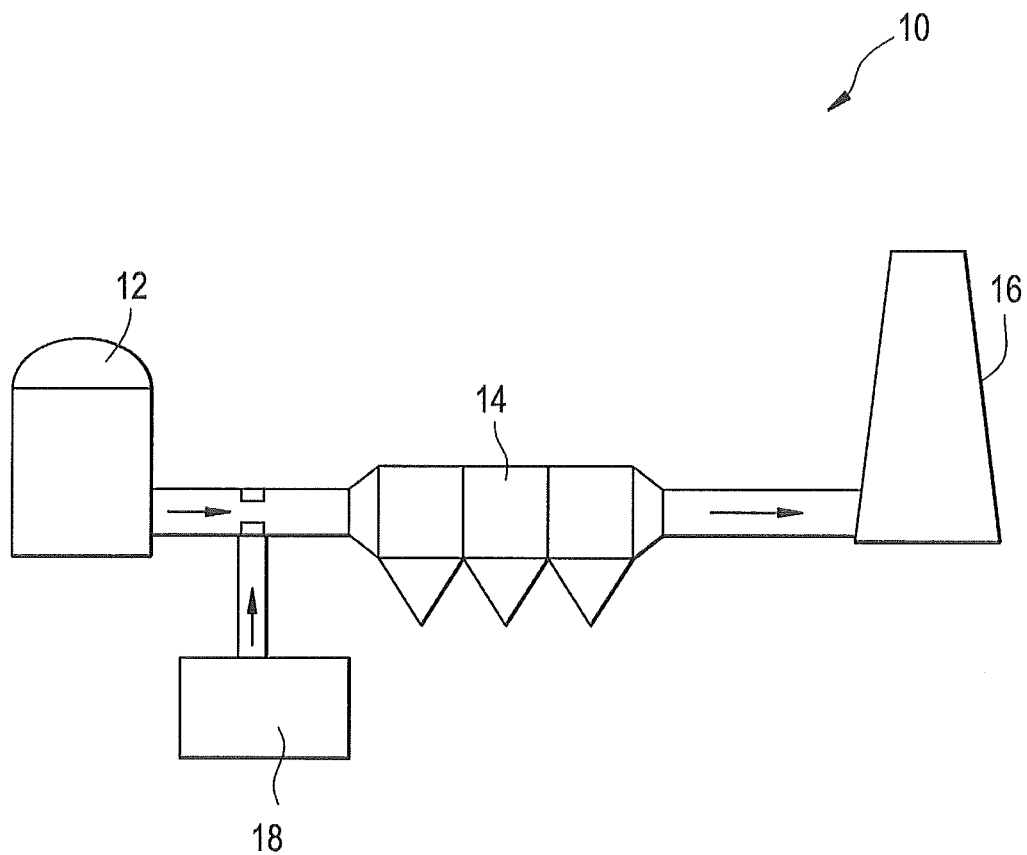

(52) U.S. Cl.
CPC .... *Y10T 137/0329* (2015.04); *Y10T 137/7736* (2015.04)

(56) References Cited

U.S. PATENT DOCUMENTS

| | | |
|---|---|---|
| 4,987,839 A | 1/1991 | Krigmont et al. |
| 5,029,535 A | 7/1991 | Krigmon et al. |
| 5,288,303 A | 2/1994 | Woracek et al. |
| 5,601,791 A | 2/1997 | Plaks et al. |
| 5,707,422 A | 1/1998 | Jacobsson et al. |
| 7,078,235 B2 | 7/2006 | Spencer et al. |
| 2004/0162038 A1 | 8/2004 | Kanazawa et al. |

FOREIGN PATENT DOCUMENTS

| | | |
|---|---|---|
| CN | 1225290 A | 8/1999 |
| DE | 34 30 016 A1 | 3/1986 |
| EP | 0 274 132 A2 | 7/1988 |
| JP | 5535996 U | 3/1980 |
| JP | 5628657 | 3/1981 |
| JP | 58501162 A | 7/1983 |
| JP | 62132560 A | 6/1987 |
| JP | 08507959 A | 8/1996 |
| JP | 3712985 B2 | 11/2005 |
| WO | 93/19852 A1 | 10/1993 |

OTHER PUBLICATIONS

Unofficial English Translation of Japanese Office Action issued in connection with corresponding JP Application No. 2015503976 on Jul. 5, 2016.

\* cited by examiner

FLUE GAS CONDITIONING SYSTEM AND METHOD

CROSS-REFERENCE TO RELATED APPLICATIONS

This application claims priority to International Application No. PCT/IB2013/052658 filed on Apr. 3, 2013, which claims priority to IN Application No. 1040/DEL/2012 filed on Apr. 4, 2012, each of which is incorporated herein in its entirety by reference.

FIELD OF THE DISCLOSURE

The present disclosure relates to industrial plant operations, and, more particularly, to flue gas conditioning system for Electrostatic Precipitators and method for minimizing the emission of the dust particles to ambient air.

BACKGROUND OF THE DISCLOSURE

In industrial plants, coal, industrial waste, domestic waste, oil, peat, biomass or any other materials are utilized for combustion in boilers in order to operate the plants and produce electricity or other products. However, combustion of such materials produces flue gas that contains dust particles, which ultimately emit into ambient air adding pollution to the surrounding environment. In order to keep such emission at low level, the industrial plants most widely utilize Electrostatic Precipitators (hereinafter referred to as "ESP"). The ESP is a device that collects the flue gas from the boiler and removes the dust particles from the flue gas using the force of an induced electrostatic charge.

The ESPs are generally designed for a particular coal type or a coal range and process conditions as the dust collection efficiency of an ESP greatly depends on characteristic of the dust it handles. However, during these days the industrial plants or utility industries frequently change the coal type due to economical pressure. Mostly the shift is toward cheaper coals that produce high resistive dust which are often difficult to collect by the ESP. In view of the said problem, the conventional ESPs need to be upgraded from time to time to make it more efficient towards the collection of the dust. However, such up gradation often means expansion of ESP which is quite expensive.

Further a method that is widely used to improve performance of the ESPs is to condition the flue gas using Flue Gas Conditioning Agents before it enters into the ESP. Some of the most common used Flue Gas Conditioning Agents (hereinafter referred to as "FGCA"), are SO3, NH3, and water. The conditioning is generally carried out by injecting any of the FGCAs or combinations thereof to the flue gases before it enters the ESPs. The FGCA improve the ESP performance by changing dust characteristics favorably.

In conventional methods, for conditioning the flue gas, the injection quantity of FGCAs is generally decided based on parameters, such as a power consumption of transformer of the ESP, opacity at stake of the industrial plant, or combination thereof However, these methods may not be the most optimal because these methods use the parameters whose values depend upon several factors besides dust characteristics. For example: when the parameter power consumption of transformer is in use, generally the FGCAs injection quantity is kept inversely changing with the power consumption. This may lead to wrong injection quantity as the power consumption variation may also be due to some other reasons, such as, high spark rate, poor gas distribution etc. beside change in dust or flue gases property. Further, most commonly used opacity signal may also not give a right indication of injection need. Sometime, a wrong opacity signal resulting in a high FGCA injection may be given due to NOx fumes in the stakes.

Boiler load is independent of dust characteristics and use of only boiler load for deciding injection quantity may go very wrong with change in process conditions such as fuel. All these parameters depends on one or more variables beside dust characteristics, therefore chances of injecting the accurate FGCAs based on these parameters may be not be good as other variables are acting constantly. To be on safer side, often, operators of the industrial plants choose to over inject the FGCAs rather than risking penalties due to high emissions. This results in high operating cost due to excess consumption of FGCAs as well as significantly increased power consumption in the ESP.

Beside this, the injection with conventional controllers may need continuous intervention of the operators to optimize, if a major process change occurs. In Industrial plants, these process changes occur very frequently, which requires continuous attention of the operators on an FGCA system to manually adjust the settings to keep FGCAs injection and emission at acceptable level.

It is important that the FGCAs are injected or added in the dust laden flue gas stream in optimum quantity as the quantity lower than necessary may not result in optimum performance of the ESP, and the quantity more than necessary may result in high cost of agent, high power consumption in the ESP, corrosion in the ESP, and dust built up etc. The existing methods of controlling the injection rate of FGCA by linking it to parameters such as transformer power consumption or opacity or boiler load or combination thereof is not enough to obviate the problems in the conventional industrial plants.

SUMMARY OF THE DISCLOSURE

In view of the forgoing disadvantages inherent in the prior-art, the object of the present disclosure is to provide a flue gas conditioning system and method for industrial plants. Such flue gas conditioning system and method are configured to include all advantages of the prior art, and to overcome the drawbacks inherent in the prior art.

An object of the present invention is to provide a system that is capable of effectively deciding optimal injection rate of a Flue Gas Conditioning Agent from a Flue Gas Conditioning Agent discharge unit to an Electrostatic Precipitator of the industrial plant, to obviate the emission problems in the conventional industrial plants.

Another object of the present invention is to provide a method that is capable of effectively deciding optimal injection rate of the FGCA from the Flue Gas Conditioning Agent discharge unit to the Electrostatic Precipitator of the industrial plant, to obviate the emission problems in the conventional industrial plants.

To achieve the above objects, in an aspect of the present disclosure, a system for determining effective injection rate of at least one Flue Gas Conditioning Agent (hereinafter referred to as "FGCA") from a Flue Gas Conditioning Agent discharge unit (hereinafter referred to as "FGCA discharge unit") into flue gases leading from a boiler to be introduce into an Electrostatic Precipitator (hereinafter referred to as "ESP") is provided.

The system comprising a plurality of primary modules configured to the ESP, each of the primary module configured to obtain a plurality of Optimal Charge Ratio Value (OCRV) for the flue gas introduced into the ESP;

at least one secondary module configured to the FGCA discharge unit, the secondary module configured to control an injection rate of the FGCA from the FGCA discharge unit; and at least one master module configured to the primary and secondary modules, the master module configured to, collect the plurality of OCRV from the primary module, calculate an average OCRV representing an average Back Corona Level (BCL) for the introduced flue gas in the ESP, and compare the average OCRV to a predetermined OCRV to obtain a differential OCRV for enabling the secondary module to control the injection rate of the FGCA for adjusting the differential OCRV to reach about null.

The differential OCRV changes with change in FGCA injection rate because the quantity of FGCA in flue gas affects the Back Coronal Level in ESP which in turn affects the plurality of the OCRVs collected by primary modules.

In further aspect the system of the present disclosure, the master module generates an electrical signal based on the differential OCRV for enabling the secondary module to control the injection rate of the FGCA for adjusting the differential OCRV. The secondary module is capable of controlling the injection rate for adjusting the differential OCRV by, changing the injection rate if the differential OCRV deviates substantially from null and freezing the injection rate if the differential OCRV reaches substantially equal to null.

In yet further aspect the system of the present disclosure provides a boiler load measuring module which receives a signal for determining a boiler load constant of the boiler. In this aspect of the present disclosure, the master module generates an electrical signal based on the differential OCRV and the boiler load constant. The secondary module is capable of controlling the injection rate for adjusting the differential OCRV pertaining the boiler load constant by changing the injection rate if the differential OCRV pertaining the boiler load constant deviates substantially from null and freezing the injection rate if the differential OCRV pertaining the boiler load constant reaches substantially equal to null.

In another aspect of the present disclosure, a method for determining injection rate of at least one Flue Gas Conditioning Agent (FGCA) from a FGCA discharge unit into flue gases leading from a boiler to be introduced into an Electrostatic Precipitator (ESP) is provided. The method comprises:

(a) obtaining a plurality of Optimal Charge Ratio Value (OCRV) for the flue gas introduced into the ESP;

(b) collecting the obtained plurality of OCRV;

(c) calculating an average OCRV representing an average Back Corona Level (BCL) for the introduced flue gas in the ESP;

(d) comparing the average OCRV to a predetermined OCRV to obtain a differential OCRV;

(e) controlling the injection rate of the FGCA for adjusting the differential OCRV; and (f) repeating (a) to (e) till the differential OCRV reaches about null.

In further aspect the method of the present disclosure, an electrical signal based on the differential OCRV is generated for controlling the injection rate of the FGCA for adjusting the differential OCRV. The adjustment may be done by changing the injection rate of the FGCA i.e. increasing or decreasing, if the differential OCRV deviates substantially from the null and freezing or maintaining the rate of injection if the differential OCRV reaches substantially equal to null.

In yet further aspect the method of the present disclosure, an boiler load constant is calculated based on actual boiler load. In this aspect of the present disclosure, an electrical signal is generated based on the differential OCRV and the boiler load constant for enabling the controlled injection rate of the FGCA for adjusting the differential OCRV to null. This is achieved by changing the injection rate if the differential OCRV pertaining the boiler load constant deviates substantially from null and freezing the injection rate if the differential OCRV pertaining the boiler load constant reaches substantially equal to null.

These together with the other aspects of the present disclosure, along with the various features of novelty that characterized the present disclosure, are pointed out with particularity in the claims annexed hereto and form a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWINGS OF THE DISCLOSURE

Figure 2:
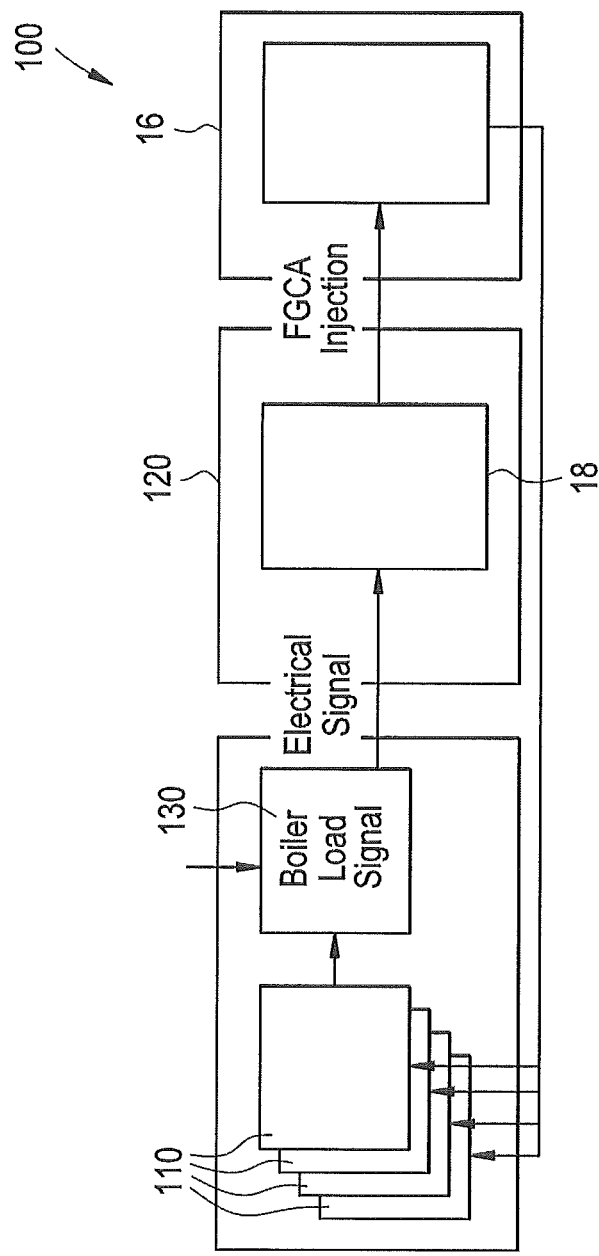
Figure 3:
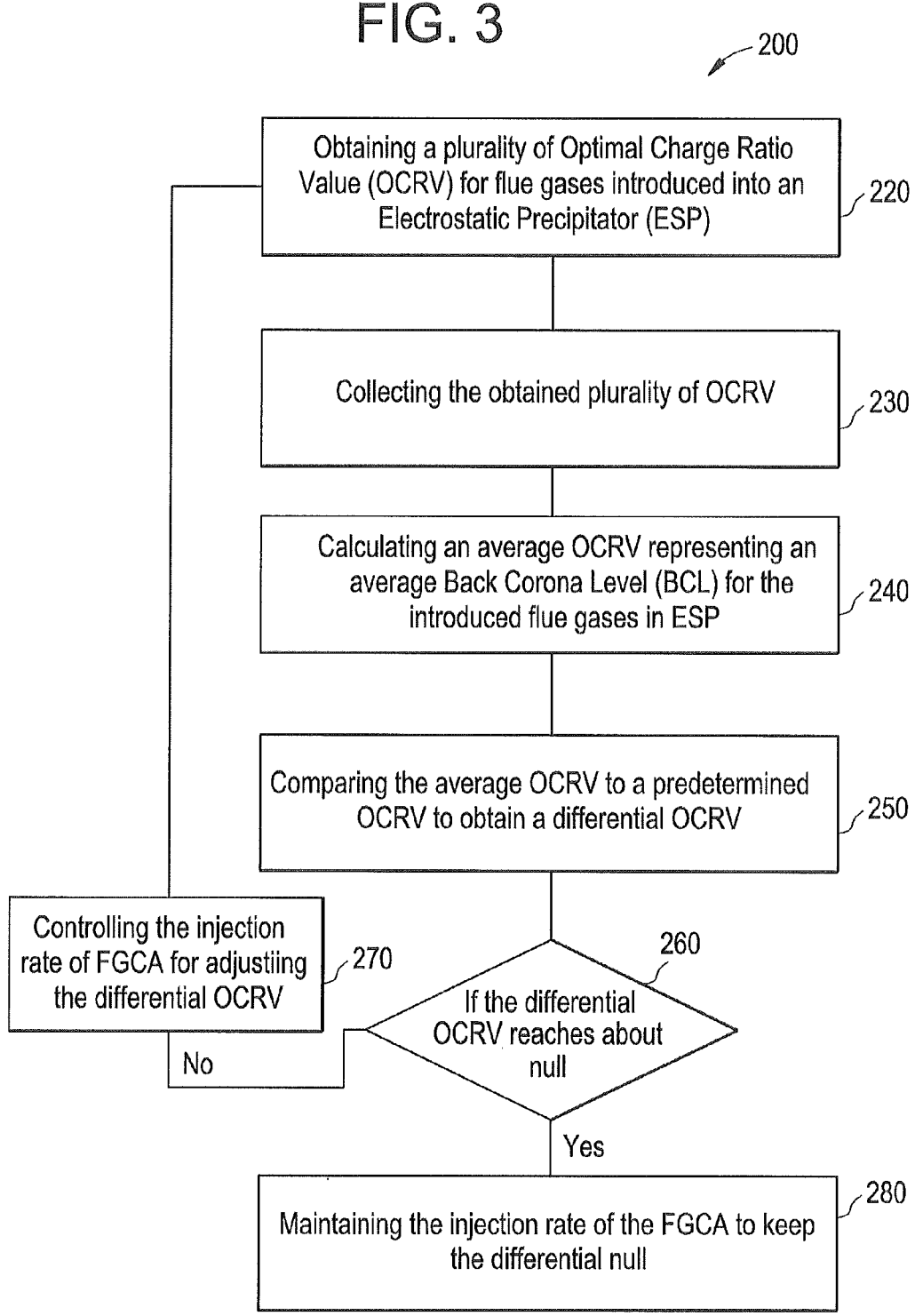

The advantages and features of the present disclosure will become better understood with reference to the following detailed description and claims taken in conjunction with the accompanying drawing, wherein like elements are identified with like symbols, and in which:

FIG. 1 illustrates a block diagram of a industrial plant, in accordance with an exemplary embodiment of the present disclosure;

FIG. 2 illustrates a block diagram of a system for determining injection rate of at least one Flue Gas Conditioning Agent (FGCA), in accordance with an exemplary embodiment of the present disclosure; and FIG. 3 illustrates a flow diagram depicting a method for determining injection rate of at least one Flue Gas Conditioning Agent (FGCA), in accordance with an exemplary embodiment of the present disclosure.

Like reference numerals refer to like parts throughout the description of several views of the drawings.

DETAILED DESCRIPTION OF THE DISCLOSURE

For a thorough understanding of the present disclosure, reference is to be made to the following detailed description, including the appended claims, in connection with the above-described drawings. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The term "primary," "secondary" and the like, herein do not denote any order, elevation or importance, but rather are used to distinguish one element over another. Further, the terms "a" and "an" herein do not denote a limitation of quantity, but rather denote the presence of at least one of the referenced item.

Referring now to FIG. 1, a block diagram of a standard industrial plant (10) is illustrated, in accordance with an exemplary embodiment of the present disclosure. The industrial plant (10) includes a boiler (12) where combustion of fuels, such as coal, industrial waste, oil, peats, biomass etc, takes place in order to operate the industrial plant (10) for the desired purpose. Commonly used fuel in the industrial plant (10) is coal of varying quality. Hereinafter, the industrial plant (10) assume to use coal as fuel and described in that conjunction, without departing the scope of excluding other fuels as known in the art. This combustion of coal produces flue gases having various dust particles, which ultimately are released in the atmosphere affecting thereto. In order to control the dust particles from or keeping its level low in the flue gases emitting to the environment, the industrial plant (10) includes an emission-control unit such as an Electrostatic Precipitators (14), (hereinafter referred to as "ESP (14)"). Generally, the flue gases with the dust particles are allowed to pass through the ESP (14), which reduces the dust particles therefrom and accordingly release relatively clean flue gases that are ultimately released to the atmosphere through a stake (16).

The ESP (14) reduces the dust particles in the flue gas by electrostatically charging the dust particles in the flue gas stream. For such electrostatic charging, the ESP (14), in one form, may include various precipitator units arranged one after another, through which flue gas with dust particles are successively conducted in order to be cleaned. Each of these precipitator units may include an inner chamber divided into a number of parallel flue gas passages by means of a number of vertical curtains of earthed steel plates arranged side by side to form the collecting electrodes of each unit. Further, a number of vertical wires to which a negative voltage is connected are arranged in each flue gas passage to form the discharge electrodes of each unit. These set of discharge electrodes and collecting electrodes that are energized by one individual transformer set is denoting a field of ESP. Further these discharge electrodes ionize the flue gases in the electric field in the flue gas passages. The negative ions are attracted by the steel plates and, when moving towards these, collide with the dust particles in the flue gases, such that the particles are charged, whereupon they are separated from the flue gases when they are attracted by the nearest steel plate (collecting electrode), where they settle and form a growing layer of dust. The dust collection efficiency of the ESP (14) varies greatly according to the electrical resistivity of the dust. In the case of high resistivity dust, also a phenomenon known as a back corona occurs, and this seriously reduces the dust collection efficiency of the ESP (14). More specifically, the back corona is a phenomenon in which spark occurs through the deposited dust layer on steel plate and the dust particles are thrown back into the flue gas and hence reduce dust collection.

To improve the ESP (14) performance by either reducing the resistivity of dust in the flue gases or increasing dust agglomeration, any of Flue Gas Conditioning Agent (herein after referred to as "FGCA"), such as $SO_3$, $NH_3$, and water or their combination may be injected through a Flue Gas Conditioning Agent discharge unit (18) (herein after referred to as "FGCA discharge unit (18)") before flue gas enters the ESP (14).

However, It is important that the FGCAs are injected or added in the flue gas stream in optimum quantity as the quantity lower than necessary may not result in optimum performance of the ESP, and the quantity more than necessary may result in high cost of agent, high power consumption in the ESPs, corrosion in the ESPs, and dust built up etc. In present disclosure an optimal injection quantity of FGCA is injected at a controlled rate i.e increasing, decreasing and maintaining the optimal injection quantity of FGCA by linking it to a Back Corona Level (hereinafter referred to as "BCL") in ESP which can be considered a direct representation of resistivity of dust for obtaining the optimum performance of the ESP.

Referring now to FIG. 2, a system (100) is illustrated and described in conjunction with FIG. 1, in accordance with an exemplary embodiment of the present disclosure. The system (100) is implemented in the industrial plant (10) and operates in conjunction with the ESP (14) and the FGCA discharge unit (18) for determining optimum injection rate of the at least one FGCA, such as $SO_3$, $NH_3$, and water or their combination thereof. Specifically, the system (100) enables the FGCA discharge unit (18) to discharge the FGCA into the flue gas stream leading from the boiler (12) to be introduced into the ESP (14). The system (100) includes a plurality of primary modules (110), at least one secondary module (120) and at least one master module (130).

The plurality of primary modules (110) may be electrically configured to the ESP (14). Each of the primary modules (110) control performance of a specific section for example field of ESP and is configured to continuously measure and calculates an Optimal Charge Ratio Value (hereinafter referred to as "OCRV"). The OCRV represents the Back Corona Level (BCL) in respective sections of ESP for the flue gas which has been introduced into the ESP. The OCRV is an exemplary term used for measuring a one measurable parameter that represents the Back Corona Level (BCL) and any other equivalent parameters representing the Back Corona Level (BCL) in ESP are also applicable here. The primary modules (110) may be controllers disposed in each of the flue gas passages of the ESP (14) for obtaining one OCRV from each field of ESP, thereby obtaining a plurality of OCRV at the given operable conditions of the flue gases in ESP. The plurality of OCRV is ultimately utilized by master module (130) to determine an average Back Corona Level (BCL) in the ESP (14), when the industrial plant (10) is running.

Further, the secondary module (120) is electrically configured to the FGCA discharge unit (18). The secondary module (120) may be a controller configured to control the injection rate of the FGCA from the FGCA discharge unit (18) to the ESP (14).

Furthermore, the master module (130) may be communicably configured to the primary and secondary modules (110, 120). In one embodiment, the master module (130) is a controller, without limiting, a 16-bit microprocessor based controller, with plurality of digital and analogue input and output, flash memory, Random Access Memory (RAM) and real time clock. However, without departing from the scope of the present disclosure, various other elements and configurations thereof with the disclosed elements of the master module (130) may be possible. The master module (130) communicates with the primary and secondary modules (110, 120) and all together enable the controlled injection of the FGCA from the FGCA discharge unit (18). Specifically, the master module (130) is configured to collect the plurality of OCRV from the primary module (110) and subsequently to calculate an average OCRV. In one embodiment the average OCRV may be represented as weighted average OCRV and obtained accordingly. This average OCRV represents the average Back Corona Level (BCL) i.e. the resistivity level of the introduced dust in flue gases in the ESP (14). Thereafter, the obtained average OCRV of the introduced gas is compared with a predetermined OCRV value to obtain a differential OCRV for enabling the secondary module (120) to control the injection rate of the FGCA suitably for adjusting the differential OCRV to reach about null. The predetermined OCRV may be in a range with maximum, minimum or just a value depending upon the ESP (14).

The predetermined or preset minimum value or a predetermined range of the OCRV, is set on primary module (110) at the time of commissioning according to the ESP's (14) condition, process and performance targets, and this predetermined OCRV represent a predetermined Back Corona Level in ESP at which its performance is optimum as desired generally irrespective of process conditions.

Aim of the master module (130) is to generate an electrical signal based on the differential OCRV for enabling the secondary module (120) to control the injection rate. The secondary module (120) controls the injection rate in a manner such that the differential OCRV value may reaches to about null. For doing so, the secondary module (120) controls the injection till the average OCRV of the ESP (14) substantially equalizes to the predetermined OCRV value or be within the predetermined OCRV range. The electrical signal from the master module (130) is generated based on the differential OCRV for increasing or decreasing the injection rate if the average OCRV is more or less than the predetermined OCRV. For example: if the average OCRV is more than the predetermined OCRV range or predetermined OCRV value, the master module (130) sends the electrical signal to the secondary module (120) to increase the rate of the injection of the FGCA so that the average OCRV of the ESP (14) substantially equalizes to the predetermined OCRV value or to be within the predetermined OCRV range. Similarly, if the average OCRV is less than the predetermined OCRV range or predetermined OCRV value, the master module (130) sends the electrical signal to the secondary module (120) to decrease the rate of the injection of the FGCA so that the average OCRV of the ESP (14) substantially equalizes to the predetermined OCRV value or to be within the predetermined OCRV range.

In further embodiment, if the differential OCRV reaches substantially equal to null, the master module (130) sends the electrical signal to the secondary module (120) to freeze or maintain the injection rate of the FGCA at same level or at slightly lower level after doing optimization trials at fixed regular time intervals. When the differential OCRV deviates from null, the master module (130) sends the electrical signal to the secondary module (120) to change the injection rate of the FGCA i.e. increasing or decreasing for bringing the differential OCRV again to be substantially null.

In another embodiment of the present disclosure, the system (100) is capable of obtaining boiler load signal and determining a boiler load constant of the boiler (12) for enabling the master module to generate an electrical signal based on both, the differential OCRV and the boiler load constant. The master module (130) of this embodiment generates an electrical signal based on the differential OCRV of the ESP (14) in consideration of the boiler load constant for enabling the secondary module (120) to control the injection rate. The secondary module (120) controls the injection rate in a manner such that the differential OCRV value may be adjusted to be substantially about null. Also if the boiler load reduces below a predefined value in master module (130) that is defined during commissioning, master module (130) generate the electrical signal such that the FGCA injection is reduced to the minimum value or completely stops irrespective of OCRV value. If the boiler load is above this predefined level, the electrical signal from the master module (130) is generated based on the differential OCRV for the ESP (14) and the boiler load constant of the boiler (12), for increasing or decreasing the injection rate of the FGCA from the FGCA discharge unit (18). For example: if the differential OCRV pertaining to the boiler load constant is substantially above null, the master module (130) sends the electrical signal to the secondary module (120) to increase the rate of the injection of the FGCA so that the average OCRV of the ESP (14) substantially equalizes to the minimum predetermined OCRV value or normal value or to be within the predetermined OCRV range, thereby nullifying the differential OCRV.

In further embodiment, if the differential OCRV reaches substantially equal to null, the master module (130) sends the electrical signal to the secondary module (120) to freeze or maintain the injection rate of the FGCA at same level or at slightly lower level after doing optimization trials at fixed regular time intervals. When the differential OCRV deviates from null, the master module (130) sends the electrical signal to the secondary module (120) to change the injection rate of the FGCA i.e. increasing or decreasing for maintaining the differential OCRV to be substantially null.

Referring now to FIG. 3, a flow diagram depicting method (200) for determining an injection rate of the FGCA is illustrated, in accordance with an exemplary embodiment of the present disclosure. The method (200) of the FIG. 3 will be described in conjunction with the FIGS. 1 and 2. At (220), plurality of the OCRV from the various sections of the ESP (14) is obtained by the plurality of primary module (110). This plurality of the OCRVs is collected by the master module (130) at (230) and subsequently the average OCRV is calculated at (240), by the master module (130), representing the average Back Corona Level (BCL) for the introduced flue gases in the ESP (14). Further, at (250), the obtained average OCRV is compared to the predetermined OCRV range or predetermined OCRV value to obtain the differential OCRV. Upon obtaining the differential OCRV the aim is to minimize or nullify it. For doing so, the master module (130) at (260) verify that whether the differential OCRV is null. In case the differential OCRV is null or minimized, then master module (130) maintains the injection rate of the FGCA at (280). In case the differential OCRV is not null or minimized and have substantially high value, the master module (130) enables the secondary module (120) to control i.e increasing or decreasing the injection rate of the FGCA from the FGCA discharge unit (18) for adjusting the differential OCRV at (270).

Particularly, the master module (130) generates the electrical signal based on the differential OCRV for enabling the secondary module (120) to control the injection rate. The secondary module (120) controls the injection rate in a manner such that the differential OCRV value may be adjusted to be substantially about null, in a manner such that mentioned herein above and excluded herein for the sake of brevity of the disclosure. In further embodiment, if the differential OCRV reaches substantially equal to null, the master module (130) sends the electrical signal to the secondary module (120) to freeze or maintain the rate of injection of the FGCA, and when the differential OCRV deviates from the null the master module (130) sends the electrical signal to the secondary module (120) to change the injection rate of the FGCA i.e. increasing or decreasing for maintaining the differential OCRV to be substantially null.

The process of nullifying the differential OCRV may be a continuous process and checked at regular interval of time. Therefore at (260), the every time new adjusted differential OCRV is checked that it is about null or not. If not, (220) to (270) are repeated until such state is reached. Once such stage is reached the method (200) maintain this stage at (280). In further embodiment, when the differential OCRV stays near or at null value, the method will repeat the steps starting from (220) after predefined time interval to ensure that the differential OCRV remains null.

In another embodiment of the present disclosure, the electrical signal to secondary module (120) is adjusted in consideration of the differential OCRV and the boiler load constant of the boiler (12). In doing so, the master module (130) generates the electrical signal based on both, the differential OCRV and the boiler load constant to substantially nullify the differential OCRV. The electrical signal is generated for increasing or decreasing the injection rate, or keeping it same, as described herein above and excluded herein for the sake of brevity.

The system (100) and the method (200) utilized in the industrial plant (10) of the present disclosure offer the following advantages. The present system and method provide controlled, automatic and optimum injection of the FGCA continuously from the FGCA discharge unit to the ESP (14), based on the average OCRV value collected directly from the ESP (14), thereby saving of the FGCA and power consumption of ESP, increasing economic and durability of the present system and method as against the conventional system and method that depend on other signals like opacity etc. The response to process transient of the present system and method against the convention system and method may also be quicker. The Flue gas conditioning agents, when injected and mixed in flue gas, change these dust characteristics favorably for easier collection, hence a better ESP efficiency can be obtained without changing process conditions or ESP size.

The system and method may avoid predictive nature of control emissions even for shorter duration that in turn makes the system and method substantially fully automatic.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

We claim:

1. A method for determining injection rate of at least one Flue Gas Conditioning Agent (FGCA) from a FGCA discharge unit into a flue gas flowing from a boiler into an Electrostatic Precipitator (ESP), the method comprising:
    (a) obtaining a plurality of Optimal Charge Ratio Values (OCRVs) for the flue gas flowing from the boiler into the ESP via a plurality of primary modules, wherein each primary module of the plurality of primary modules is operable to measure and to calculate an Optimal Charge Ratio Value (OCRV) for the flue gas in a section of the ESP in which the primary module is arranged;
    (b) collecting the obtained plurality of OCRVs in at least one master module operative to electronically receive the plurality of OCRVs from the plurality of primary modules;
    (c) calculating in the at least one master module an average OCRV representing an average Back Corona Level (BCL) for the flue gas in the ESP;
    (d) comparing in the at least one master module the average OCRV to a predetermined OCRV to obtain a differential OCRV;
    (e) controlling the injection rate of the FGCA to adjust the differential OCRV via at least one secondary module operable to electronically receive the differential OCRV from the at least one master module and to control the injection rate of the FGCA from the FGCA discharge unit based on the electronically received differential OCRV; and
    (f) repeating (a) to (e) until the differential OCRV reaches substantially null.

2. The method as claimed in claim 1, wherein controlling the injection rate to adjust the differential OCRV comprises
    changing the injection rate if the differential OCRV deviates substantially from null, and
    maintaining the injection rate if the differential OCRV reaches substantially equal to null.

3. The method as claimed in claim 1, wherein the injection rate of the FGCA to adjust the differential OCRV is controlled by at least one secondary module, via the at least one master module generating an electrical signal based on the differential OCRV, and receipt of the generated electrical signal by the at least one secondary module.

4. The method as claimed in claim 1, further comprising determining a boiler load constant of the boiler via a boiler load measuring module operable to determine the boiler load constant of the boiler and to generate an electrical signal of the boiler load constant, with receipt of the generated electrical signal by the at least one master module.

5. The method as claimed in claim 1, further comprising determining a boiler load constant of the boiler via a boiler load measuring module operable to determine the boiler load constant of the boiler and to generate an electrical signal of the boiler load constant, with receipt of the generated electrical signal by the at least one master module, wherein controlling the injection rate comprises the at least one master module generating an electrical signal based on the boiler load constant and the differential OCRV, with the generated electrical signal received by the at least one secondary module for the at least one secondary module to control the injection rate of the FGCA based on the boiler load constant and the differential OCRV.

6. The method as claimed in claim 1, further comprising determining a boiler load constant of the boiler via a boiler load measuring module operable to determine the boiler load constant of the boiler and to generate an electrical signal of the boiler load constant with the generated electrical signal received by the at least one master module, and controlling the injection rate by the at least one master module generating an electrical signal based on the boiler load constant and the differential OCRV, with the generated electrical signal received by the at least one secondary module for the at least one secondary module to control the injection rate of the FGCA based on the boiler load constant and the differential OCRV,
    wherein controlling the injection rate to adjust the differential OCRV to the boiler load constant comprises, changing the injection rate if the differential OCRV pertaining the boiler load constant deviates substantially from null, and freezing the injection rate if the differential OCRV pertaining the boiler load constant reaches substantially equal to null.

7. A system for determining injection rate of at least one Flue Gas Conditioning Agent (FGCA) from a FGCA discharge unit into a flue gas flowing from a boiler into an Electrostatic Precipitator (ESP), the system comprising:

the boiler;

the ESP;

the FGCA discharge unit configured to discharge at least one FGCA into the flue gas flowing from the boiler to the ESP;

a plurality of primary module, wherein each primary module of the plurality of primary modules are configured to measure and to calculate Optimal Charge Ratio Value (OCRV) for the flue gas in a section of the ESP in which each of the primary module is arranged;

at least one secondary module configured to control an injection rate of the FGCA from the FGCA discharge unit into the flue gas prior to flue gas flow into the ESP;

at least one master module configured:

to electronically receive a plurality of OCRVs from the plurality of primary modules, to calculate an average OCRV representing an average Back Corona Level (BCL) for the flue gas in the ESP, to compare the average OCRV to a predetermined OCRV to obtain a differential OCRV, and to electronically transmit the differential QCRV to the at least one secondary module for the at least one secondary module to control the injection rate of the FGCA based on the differential OCRV, until the differential OCRV reaches substantially null.

8. The system as claimed in claim 7, wherein the at least one master module generates an electrical signal based on the differential OCRV, with the generated electrical signal received by and used by the at least one secondary module to control the injection rate of the FGCA to adjust the differential OCRV to reach about null.

9. The system as claimed in claim 7, wherein the at least one master module generates an electrical signal based on the differential OCRV with the generated electrical signal received by and used by the at least one secondary module to control the injection rate of the FGCA to adjust the differential OCRV by changing the injection rate if the differential OCRV deviates substantially from null, and freezing the injection rate if the differential OCRV reaches substantially equal to null.

10. The system as claimed in claim 7, further comprises a boiler load measuring module operable to determine a boiler load constant of the boiler.

11. The system as claimed in claim 7, further comprising a boiler load measuring module operable to determine a boiler load constant of the boiler and to generate an electrical signal of the boiler load constant, with the generated electrical signal received by the at least one master module, for the at least one master module to generate an electrical signal based on the differential OCRV and the boiler load constant, with the generated electrical signal received by the at least one secondary module to control the injection rate of the FGCA to adjust the differential OCRV.

12. The system as claimed in claim 7, further comprising a boiler load measuring module operable to determine a boiler load constant of the boiler and to generate an electrical signal of the boiler load constant, with the generated electrical signal received by the at least one master module, for the at least one master module to generate an electrical signal based on the differential OCRV and the boiler load constant, with the generated electrical signal received by the at least one secondary module to control the injection rate of the FGCA to adjust the differential OCRV, wherein the at least one secondary module is operable to control the injection rate to adjust the differential OCRV pertaining the boiler load constant by, changing the injection rate if the differential OCRV pertaining the boiler load constant deviates substantially from null, and freezing the injection rate if the differential OCRV pertaining the boiler load constant reaches substantially equal to null.

* * * * *